(12) United States Patent
Engelhart, Sr.

(10) Patent No.: US 7,974,646 B2
(45) Date of Patent: *Jul. 5, 2011

(54) NETWORK INITIATED USSD IN MIXED NETWORKS

(75) Inventor: Robert Lee Engelhart, Sr., Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/751,256

(22) Filed: Mar. 31, 2010

(65) Prior Publication Data

US 2010/0190485 A1 Jul. 29, 2010

Related U.S. Application Data

(63) Continuation of application No. 11/548,809, filed on Oct. 12, 2006, now Pat. No. 7,720,489.

(51) Int. Cl.
*H04W 4/00* (2009.01)

(52) U.S. Cl. .......... 455/466; 455/456.1; 455/422.1; 455/433; 370/352

(58) Field of Classification Search .......... 455/466, 455/456.1–457, 433; 370/352, 356
See application file for complete search history.

(56) References Cited

U.S. PATENT DOCUMENTS

| | | | |
|---|---|---|---|
| 5,752,188 A * | 5/1998 | Astrom et al. ............ 455/433 |
| 5,930,699 A | 7/1999 | Bhatia |
| 5,999,825 A * | 12/1999 | Geulen ........................ 455/560 |
| 6,081,711 A | 6/2000 | Geulen |
| 6,101,393 A * | 8/2000 | Alperovich et al. ......... 455/466 |
| H001895 H | 10/2000 | Hoffpauir et al. |
| 6,192,237 B1 * | 2/2001 | Clapton et al. ............ 455/422.1 |
| 6,295,454 B1 | 9/2001 | Havinis et al. |
| 6,496,689 B1 * | 12/2002 | Keller et al. ............... 455/406 |
| 6,510,323 B1 * | 1/2003 | Stocker et al. ............. 455/466 |
| 6,516,197 B2 * | 2/2003 | Havinis et al. ............ 455/456.1 |
| 6,834,196 B1 * | 12/2004 | Tarnanen et al. ........... 455/466 |
| 7,020,479 B2 * | 3/2006 | Martschitsch ............. 455/466 |
| 7,088,995 B2 | 8/2006 | Rao |
| 7,089,001 B2 | 8/2006 | Leung et al. |
| 7,142,876 B2 | 11/2006 | Trossen et al. |
| 7,164,927 B1 * | 1/2007 | Koch et al. ................. 455/466 |
| 7,242,676 B2 | 7/2007 | Rao et al. |
| 7,353,016 B2 | 4/2008 | Roundtree et al. |
| 7,369,848 B2 | 5/2008 | Jiang |
| 7,496,370 B2 * | 2/2009 | Bhaumick ................. 455/456.5 |
| 7,623,469 B2 | 11/2009 | Kuure et al. |
| 7,664,494 B2 * | 2/2010 | Jiang ........................ 455/432.1 |
| 7,778,646 B2 * | 8/2010 | Noldus et al. ............. 455/456.1 |
| 2003/0058277 A1 | 3/2003 | Bowman-Amuah |
| 2005/0058125 A1 | 3/2005 | Mutikainen et al. |
| 2005/0154774 A1 | 7/2005 | Giaffreda et al. |
| 2005/0195799 A1 | 9/2005 | Burne et al. |

(Continued)

OTHER PUBLICATIONS

Final OA mailed Jul. 18, 2009 for U.S. Appl. No. 11/548,809, 12 pages.

(Continued)

*Primary Examiner* — Sharad Rampuria

(57) ABSTRACT

The claimed subject matter provides systems and/or methods that facilitate sending a network initiated USSD message via a mixed network to user equipment. An application server component can communicate to user equipment. A location component can aggregate location data associated with the user equipment, wherein the location component can utilize the last known location data to send a network initiated USSD message to the user equipment via a mixed network.

17 Claims, 10 Drawing Sheets

U.S. PATENT DOCUMENTS

2006/0052113 A1 3/2006 Ophir et al.
2006/0114882 A1 6/2006 Mills
2009/0247193 A1 10/2009 Kalavade
2009/0298458 A1 12/2009 Bakker et al.

OTHER PUBLICATIONS

OA mailed Jan. 27, 2009 for U.S. Appl. No. 11/548,809, 36 pages.

Saha, et al., Bringing the wireless Internet to mobile devices, Jun. 2001 for Computer, vol. 34, Issue 6, pp. 54-58.

Notice of Allowance mailed Feb. 18, 2010 for U.S. Appl. No. 11/548,809, 21 pages.

International Search Report and Written Opinion mailed Mar. 14, 2008 for PCT Application No. PCT/US07/81164, 9 pages.

* cited by examiner

NETWORK INITIATED USSD IN MIXED NETWORKS

CROSS REFERENCE TO RELATED APPLICATIONS

This application is a continuation of U.S. patent application Ser. No. 11/548,809, filed on Oct. 12, 2006, entitled "NETWORK INITIATED USSD IN MIXED NETWORKS", the entirety of which is incorporated herein by reference.

TECHNICAL FIELD

The subject innovation relates to transferring data via a wireless communications network, and more specifically, to communicating network initiated unstructured supplementary service data (USSD) to user equipment.

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's mobile devices (e.g., mobile phones, personal digital assistants (PDAs), any suitable user equipment for communication, . . . ) can be utilized as full-service computing mechanisms. For example, many of the most recent and advanced mobile devices can be associated with word processing software, web browsing software, electronic mail software, accounting software, and various other types of software. Moreover, mobile devices can oftentimes be utilized as cameras, videocameras, audio recorders, and the like. Furthermore, network coverage has expanded to cover millions, if not billions, of users. Additionally, mobile devices have decreased in both size and cost. Specifically, modern mobile devices are often small enough to slip into an individual's pocket without discomforting the individual. Furthermore, many mobile network service providers offer phones and/or disparate devices at extremely low cost to customers who contract for service with such providers.

An unstructured supplementary service data (USSD) mechanism allows the Mobile Station (MS) user (e.g., via such mobile devices) and a PLMN operator (e.g., Public Land Mobile Network operator—the entity which offers telecommunications services over an air interface) defined application to communicate in a way which is transparent to the MS and to intermediate network entities. The mechanism allows development of PLMN specific supplementary services. The handling of USSD can be carried out independent of the applications. The USSD can be initiated by the MS user or by the network by utilizing the network initiated USSD and the mobile initiated USSD respectively.

A network (e.g., Mobile Switching Centre (MSC), Visitor Location Register (VLR), and/or a Home Location Register (HLR), etc.) can at any time send a USSD operation towards an MS and/or mobile device (e.g., also referred to as user equipment). This operation may be either a request (asking the MS to provide information) or a notification (requiring no information in the response from the MS). No prior provision of USSD is required, although provision of services which make use of USSD may be required. All USSD requests, notifications and responses (except responses to notifications) contain the USSD string, an alphabet indicator and language indicator. In regards to mixed networks, communicating such network initiated USSD messages can be problematic and/or extraneous. Conventionally, network type information is provisioned on a per-subscriber basis in at least one of a Server Control Function (SCF), Signaling Transfer Point (STP), and/or another network entity utilizing a mapping technique and/or an emulation technique. Such conventional techniques are costly, inefficient, and meticulous.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter described herein relates to systems and/or methods that facilitate sending a network initiated USSD message via a mixed network to user equipment. A location component can be integrated into an application server component, wherein the location component can utilize location data associated with user equipment in order to transmit a network initiated unstructured supplementary service data (USSD) message to user equipment via a mixed network. In particular, the location component can collect and store location data associated with user equipment such that the last known location data can be utilized to send the network initiated USSD message through the mixed network. The user equipment can be a mobile device, a communication device, a mobile communication device, a gaming device, a portable media player, a cellular phone, a mobile phone, a portable device (e.g., laptop, handheld such as a personal digital assistant (PDA), portable music player, portable gaming device, . . . ), a desktop device, a home media center, a smartphone, any suitable device that can receive a network initiated USSD message, etc.

In accordance with various aspects of the claimed subject matter, the mixed network can include a global system for mobile communications (GSM) component and an IP multimedia subsystem (IMS) component. The location component can employ location data in order to send the network initiated USSD message via the mixed network which can include the GSM component and IMS component. Moreover, the application server component can utilize a data store which can store at least a portion of location data, such as a last known location, a current location, an inferred location, a predicted location, any suitable portion of data related to a location of user equipment, previous activity data associated with user equipment, etc. In other aspects of the claimed subject matter, methods are provided that facilitate communicating network initiated USSD messages to user equipment via a mixed network including GSM and IMS.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
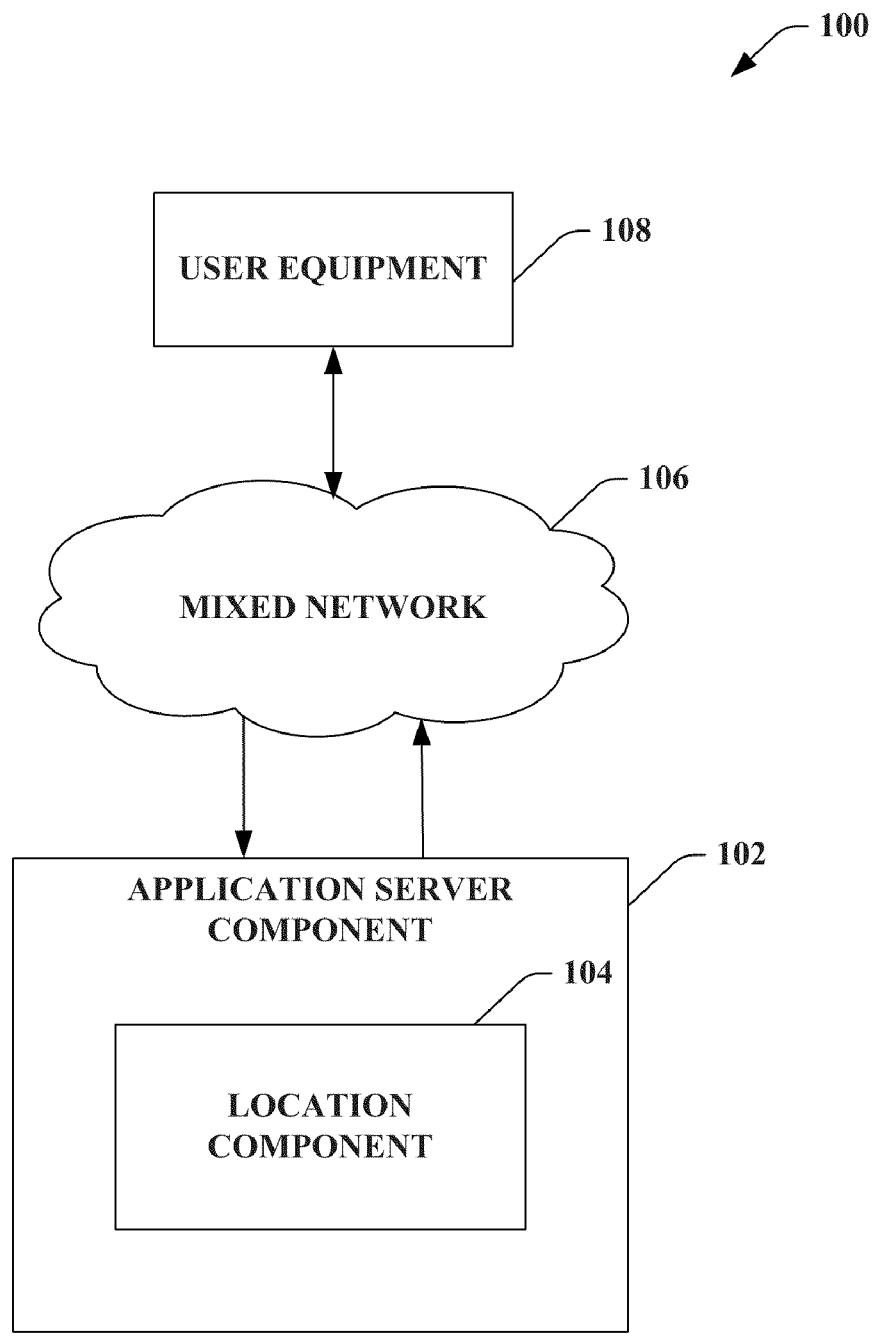
FIG. 1 illustrates a block diagram of an example system that facilitates sending a network initiated USSD message via a mixed network to user equipment.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "network," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Referring initially to the drawings, FIG. 1 illustrates a system 100 that facilitates sending a network initiated USSD message via a mixed network to user equipment. The system 100 can include an application server component 102 with an incorporated location component 104 that can utilize stored location data associated with user equipment 108 to communicate a network initiated unstructured supplementary service data (USSD) message to such user equipment via a mixed network 106. It is to be appreciated that the location data can be stored locally on the application server component 102 in order to facilitate transmitting the network initiated USSD message, wherein such location data can be, but is not limited to being, a last known location, a current location, an inferred location, a predicted location, any suitable portion of data related to a location of user equipment, previous activity data associated with user equipment 108, etc. The location component 104 can store and implement at least a portion of location data associated with the user equipment 108 in order to transmit/communicate a network initiated USSD thereto. Furthermore, the location component 104 can utilize location data stored locally to communicate the network initiated USSD to the user equipment 108 via the mixed network 106, wherein the mixed network can include, for instance, global system for mobile communications (GSM), IP multimedia subsystem (IMS), and the like (e.g., discussed infra).

Moreover, the user equipment can be, but is not limited to being, a mobile device, a communication device, a mobile communication device, a gaming device, a portable media player, a cellular phone, a mobile phone, a portable device (e.g., laptop, handheld such as a personal digital assistant (PDA), portable music player, portable gaming device, . . . ), a desktop device, a home media center, a smartphone, any suitable device that can receive a network initiated USSD message, etc. Thus, for instance, the location component 104 can utilize locally stored location data within the application server component 102 to transmit a network initiated USSD message to a cellular device (e.g., user equipment 108).

In one example, the application server component 102 can transmit a network initiated USSD message to a mobile communication device user (e.g., user equipment, a cellular phone, etc.). Yet, within the mixed network 106, the location of the mobile communication device may be unknown due to, for instance, the mobile communication device utilizing IMS in the mixed network 106 rather than GSM. In particular, the location data for a mobile communication device will be unknown within IMS because GSM registers with a home location register (HLR) which contains location data, but IMS does not include such location data (e.g., registration to the HLR is for GSM entities). The location component 104 can aggregate data related to the last known location as indicated by previous activity to the mixed network 106 and/or application server component 102 (e.g., GSM, application server, etc.). Thus, the network initiated USSD message can be communicated to the mobile communication device via the mixed network 106 utilizing the location data (e.g., last known location) regardless of the mixed network type.

Figure 2:
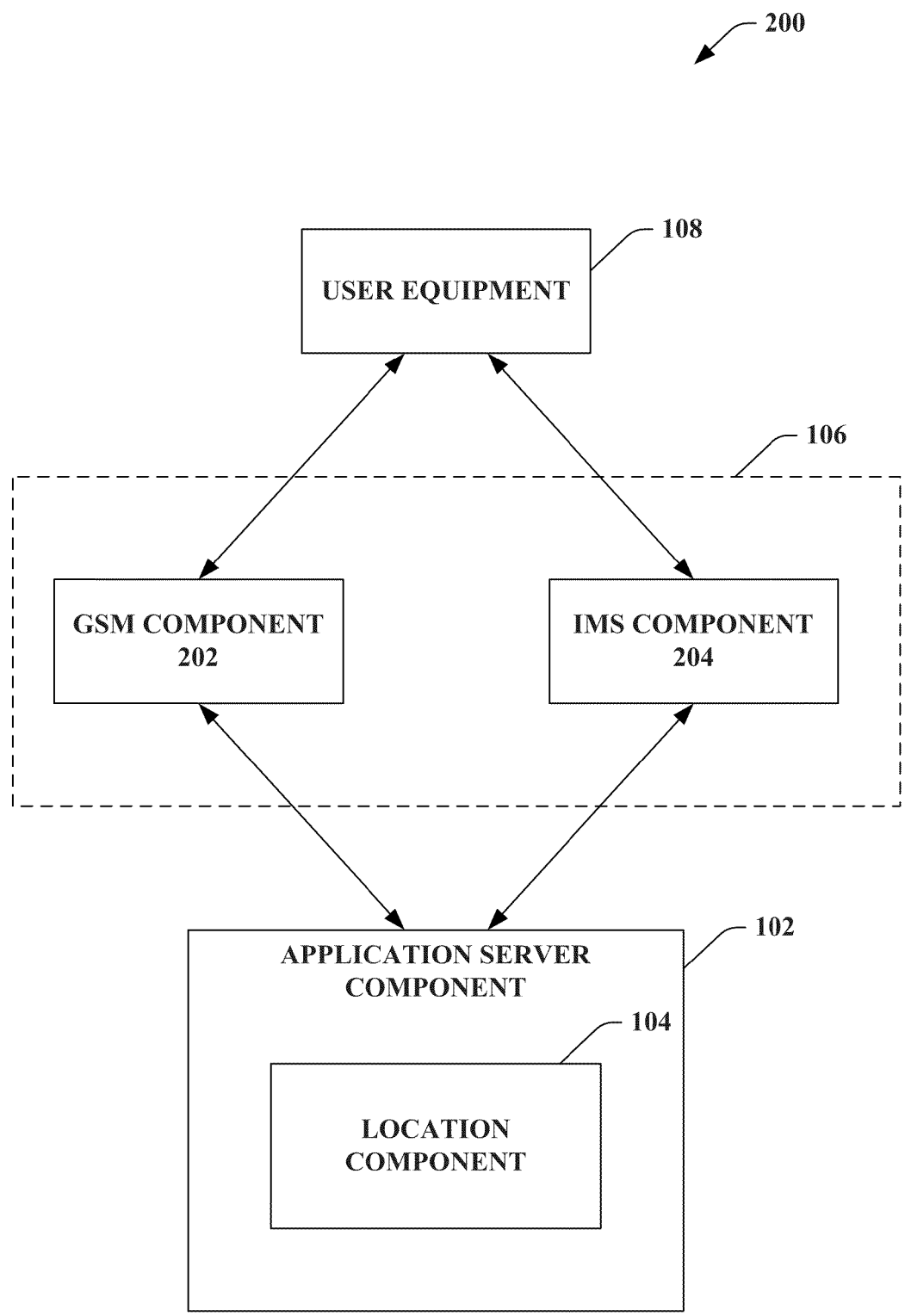
FIG. 2 illustrates a block diagram of an example system that facilitates communicating network initiated USSD messages to user equipment via a mixed network including GSM and IMS.

With reference to FIG. 2, illustrated is a system 200 that facilitates communicating network initiated USSD messages to user equipment via a mixed network including GSM and IMS. The system 200 can include the application server component 102 that can integrate the location component 104, wherein the location component 104 can aggregate location data associated with user equipment 108. In particular, the location component 104 can collect and/or track location data associated with user equipment 108 to ensure up-to-date location data. For example, the user equipment 108 can change locations from location A to location B, from location B to location C, and so on and so forth. The location component 104 can collect, track and/or store such location data to ensure at least the most current location data. Thus, the location component 104 can track/collect/store all location data associated with the user equipment 108, a portion of location data associated with the user equipment 108, the last known location associated with user equipment 108, and/or any combination thereof.

The application server component 102 and incorporated location component 104 can communicate a network initiated USSD to user equipment 108 within the mixed network 106 utilizing the location data. For instance, the mixed network 106 can include a global system for mobile communications (GSM) component 202 and an IP multimedia subsystem (IMS) component 204. For example, the GSM component 202 can utilize location data based at least in part upon the user equipment 108 registering within a home location register (HLR); yet the IMS component 204 does not utilize such location data based at least in part upon the HLR being a GSM entity and the user equipment 108 not registering therewith. Thus, by utilizing the location component 104 to employ location data (e.g., the last known location), a network initiated USSD message can be communicated to the user equipment 108 via the mixed network 106 regardless of not having the location data and/or access thereto.

Figure 3:
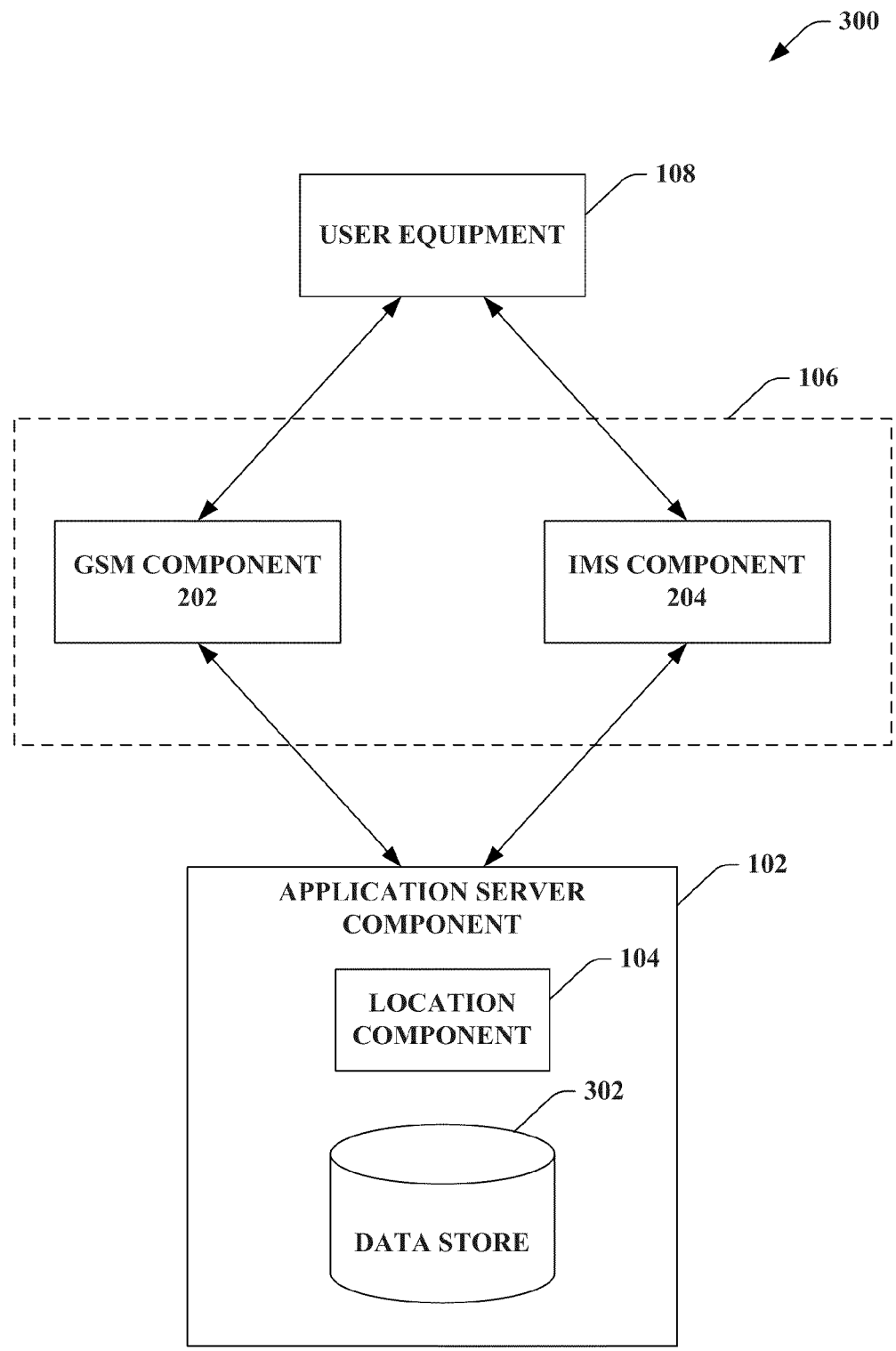
FIG. 3 illustrates a block diagram of an example system that facilitates utilizing a portion of location data within an application server to transmit a network initiated USSD message.

Turning to FIG. 3, illustrated is a system 300 that facilitates utilizing a portion of location data within an application server component to transmit a network initiated USSD message. The system 300 can include the application server component 102 with an incorporated location component 104 that can employ location data in order to transmit a network initiated USSD message to the user equipment 108 through a mixed network 106. The location component 104 can utilize a data store 302 that can store any suitable data associated with the system 300. In particular, the data store 302 can store a portion of data, location data, last location associated with user equipment 108, inferred location data, predicted location data, time of location, date of location data, source of location data, configurations, settings, metadata associated with location data, etc. The data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

The system 300 can send a network initiated USSD message from the GSM component 202, the application server component 102, and/or the IMS component 204 to the user equipment 108. In one example, the network initiated USSD message can be sent directly to the last known visitor location register (VLR) or serving call session control function (S-CSCF) address of the user equipment 108 as indicated in previous user equipment 108 initiated messages (e.g., InitialDP CAMEL messages, etc.). In such example, the service control function (SCF) or application server component 102 can emulate a home location register (HLR) to send the message directly to the VLR or S-CSCF.

In another example, the last known VLR or S-CSCF E.164 address or IP address can be utilized to determine if the message is to be sent through the normal GSM methods/techniques already defined by 3GPP (e.g., $3^{rd}$ Generation Partnership Project) or to send the message to the S-CSCF utilizing session initiated protocol (SIP) extensions to encapsulate the USSD message. It is to be appreciated that any suitable address can be utilized to determine the location of the system. For instance, an address, in general, can refer to the location of the system using an identity appropriate for the type of network, (e.g., E.164 for GSM or IMS; IP for WiFi, etc.). In such example, the SCF or application server component 102 can determine the network (e.g., GSM or IMS) and method/technique (e.g., mobile application part (MAP) message or SIP message) based on the E.164 address or IP address. The format of the E.164 or IP address can indicate which network the USSD message is to be sent over. For instance, a certain range is for GSM only. Another range is for IMS only. Other ranges are set aside for different types of networks (e.g., WiFi, WiMAX, etc.).

In yet another example, the last known VLR or S-CSCF address of the user equipment 108 is used to look up the network type in a local SCF or application server database, and/or data store 302 (e.g., in memory, on disk, etc.). In addition, utilizing the last known location information as indicated by previous activity to the SCF or application server component 102 can be implemented by the location component 104. The system 300 can be applied to any suitable mixed network type where a USSD message needs to be sent and last location information is accessible and/or available. In another example, the IP address of the user equipment 108 can be utilized by the application server component 102 to send the USSD message directly to the user equipment 108.

Figure 4:
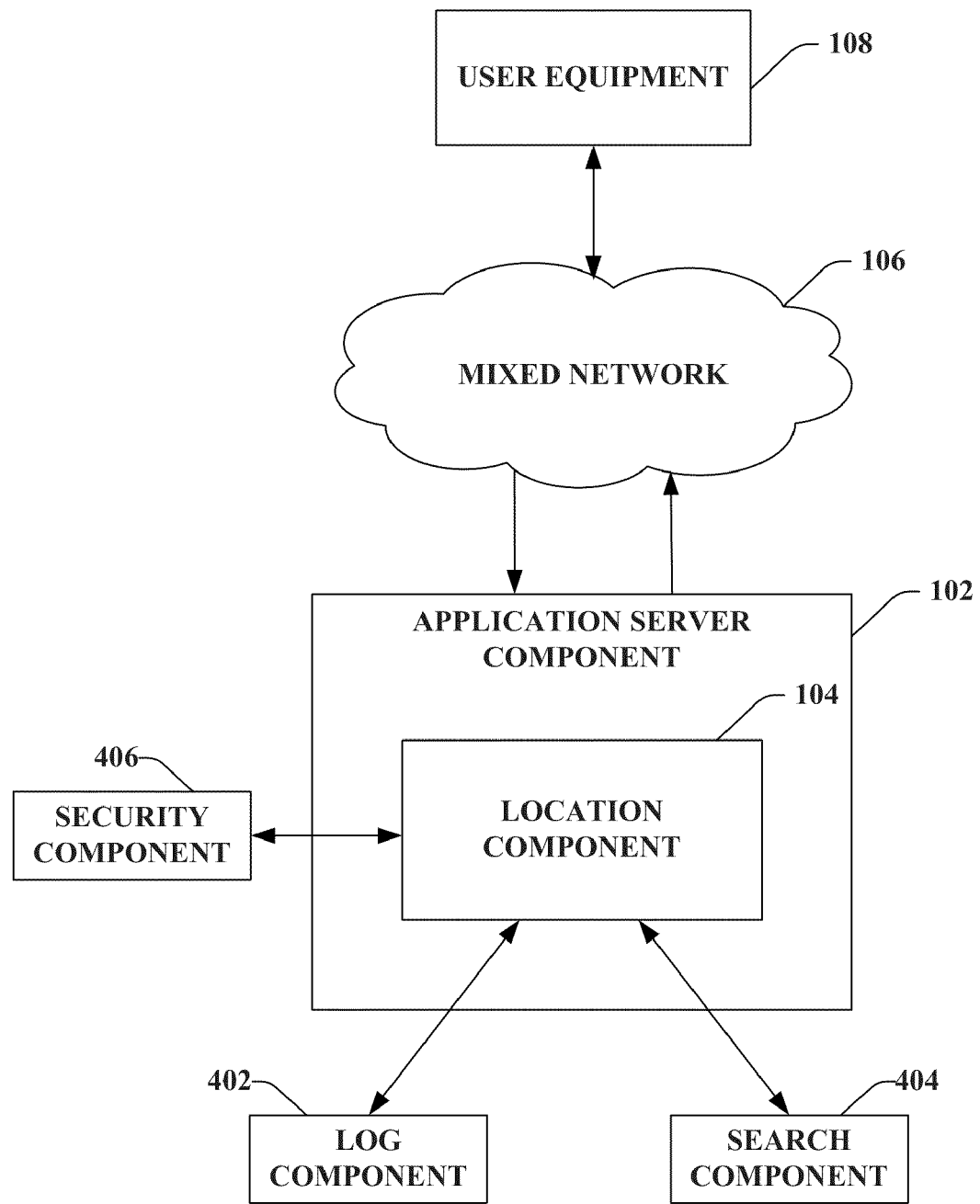
FIG. 4 illustrates a block diagram of an example system that facilitates sending a network initiated USSD message via a mixed network to user equipment.

Referring now to FIG. 4, illustrated is a system 400 that facilitates sending a network initiated USSD message via a mixed network to user equipment. The location component 104 can utilize a log component 402 that tracks location data associated with the user equipment 108. It is to be appreciated that the log component 402 can be a stand-alone component, incorporated into the location component 104, incorporated into the application server component 102, and/or any combination thereof. The log component 402 can log various information related to location data and/or changes associated therewith of the user equipment 108. Moreover, the log component 402 can store the logged entries in a data store (not shown).

The location component 104 can further implement a search component 404 that facilitates querying any data associated with the system 400. The search component 404 allows a user and/or any component to query to system 400 in relation to location data, last known location, user equipment 108 location data, user equipment, mixed network information, etc. For instance, a user can query the system 400 utilizing the search component 404 to find a portion of location data associated with specific user equipment 108. It is to be appreciated that a plurality of searches and/or queries can be implemented by the search component 404 and the above example is not to be limiting on the claimed subject matter. Moreover, it is to be appreciated that the search component 404 is depicted as a stand-alone component, but the search component 404 can be incorporated into the application server component 102, incorporated into the location component 104, a stand-alone component, and/or any combination thereof.

The location component 104 can further utilize a security component 406 that provides security to the system 400 to ensure data integrity and/or access. In particular, the security component 406 can define security, authorization, and/or privileges in accordance with at least one of a pre-defined hierarchy, security level, username, password, access rights, data importance (e.g., more important data correlates with high security clearance), etc. For instance, a particular portion of location data can be a first security level with distinct security authorizations and/or privileges, while a disparate portion of location data can have a second security level with disparate security authorizations and/or privileges. Thus, the security component 406 can provide granular security in relation to user equipment, location data, mixed network data, etc. It is to be appreciated that there can be various levels of security with numerous characteristics associated with each level and that the subject innovation is not limited to the above example. Moreover, the security component 406 provides granular security and/or privileges to the system 400. It is to be appreciated that security component 406 can be a stand-alone component, incorporated into the location component 104, incorporated into the application server component 102, and/or any combination thereof.

Figure 5:
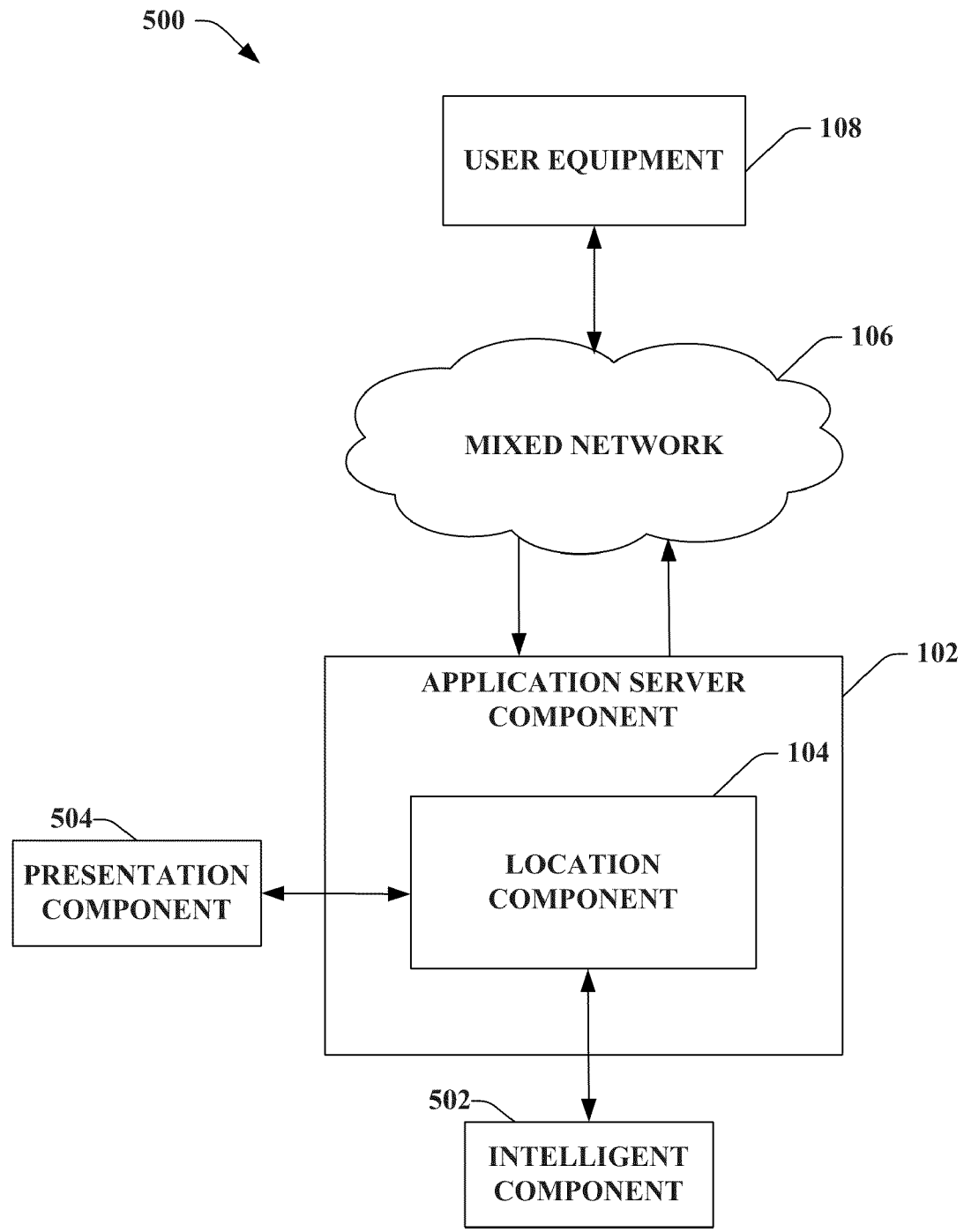
FIG. 5 illustrates a block diagram of an example system that facilitates ascertaining a location associated with user equipment to facilitate transmitting a network initiated USSD.

With reference to FIG. 5, illustrated is a system 500 that employs intelligence to facilitate ascertaining a location associated with user equipment to facilitate transmitting a network initiated USSD. The system 500 can include the application server component 102, the location component 104, the mixed network 106, and user equipment 108 that can all be substantially similar to respective components, networks, and equipment described in previous figures. The system 500 further includes an intelligent component 502. The intelligent component 502 can be utilized by the location component 104 to facilitate sending a network initiated USSD message to user equipment 108 via the mixed network 106 utilizing last known and/or most recent location data. For instance, the intelligent component 502 can infer which location data is most recent, location data accuracy, location data, location data and user equipment 108 association, etc.

It is to be understood that the intelligent component 502 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 504 can provide various types of user interfaces to facilitate interaction between a user and any component coupled to the location component 104. As depicted, the presentation component 504 is a separate entity that can be utilized with the location component 104. However, it is to be appreciated that the presentation component 504 and/or similar view components can be incorporated into the location component 104 and/or a stand-alone unit. The presentation component 504 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the location component 104.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
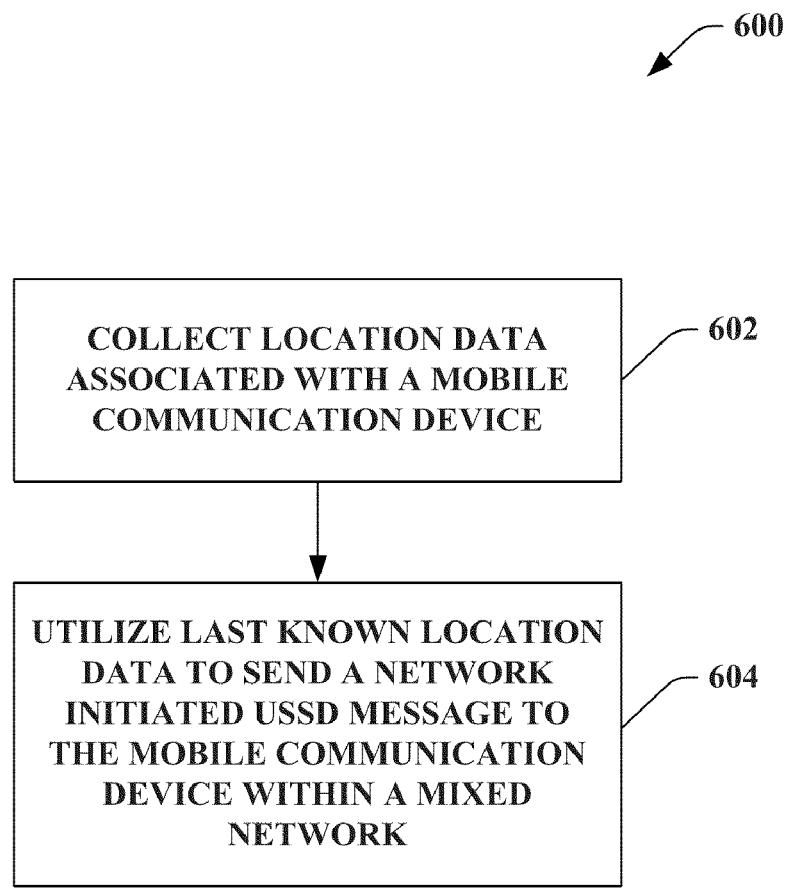
FIG. 6 illustrates an example methodology that facilitates sending a network initiated USSD message via a mixed network to user equipment.
Figure 7:
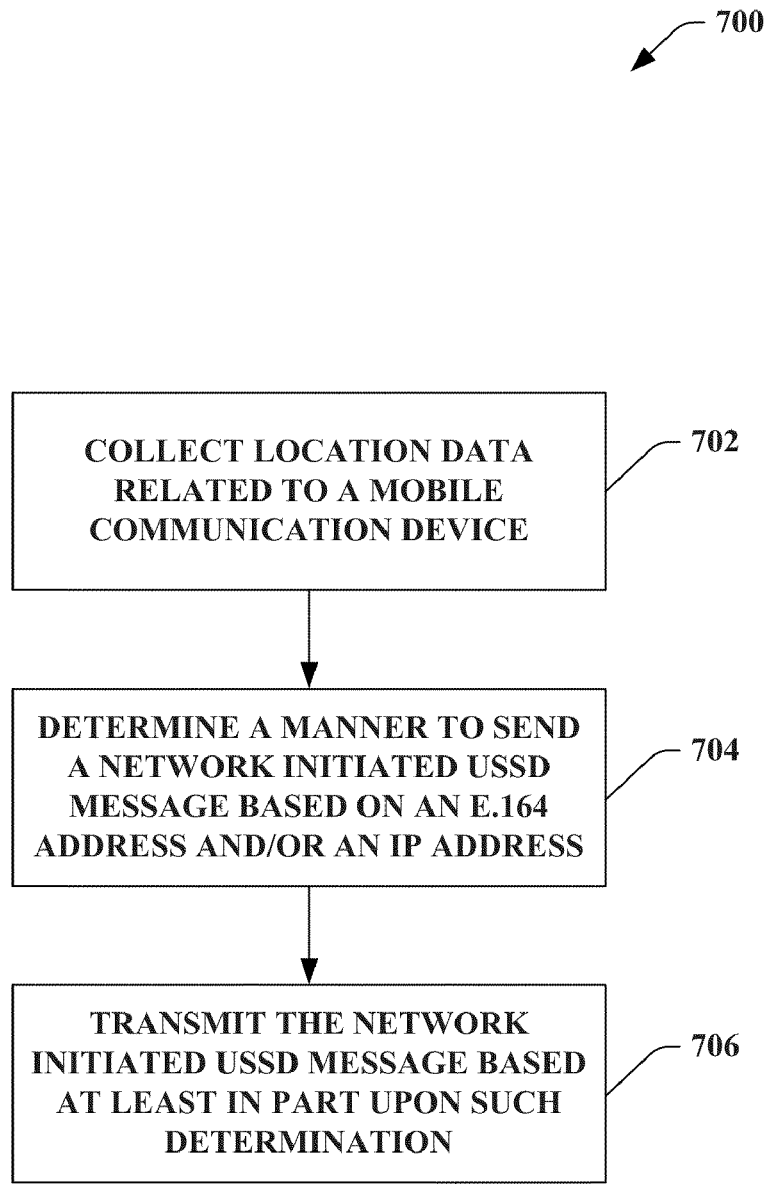
FIG. 7 illustrates an example methodology that facilitates communicating network initiated USSD messages to user equipment via a mixed network including GSM and IMS.
Figure 8:
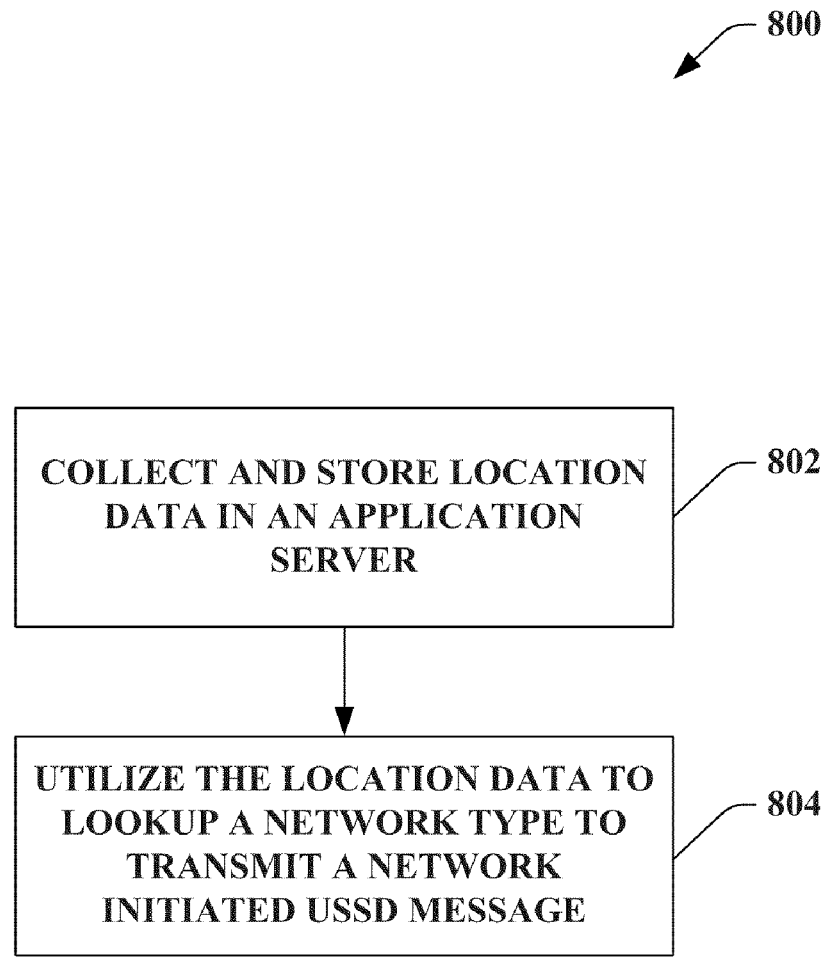
FIG. 8 illustrates an example methodology that facilitates storing a portion of location data associated with user equipment to allow transmission of a network initiated USSD.

Referring to FIGS. 6-8, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, illustrated is a methodology 600 that facilitates sending a network initiated USSD message via a mixed network to user equipment. At reference numeral 602, location data associated with a mobile communication device can be collected. It is to be appreciated that the mobile communication device can be any suitable user equipment such as, but not limited to, a mobile device, a communication device, a gaming device, a portable media player, a cellular phone, a mobile phone, a portable device (e.g., laptop, handheld such as a personal digital assistant (PDA), portable music player, portable gaming device, . . . ), a desktop device, a home media center, a smartphone, any suitable device that can receive a network initiated USSD message, etc. Furthermore, the location data can be related to the mobile communication device and can be, but is not limited to being, a last known location, a current location, an inferred location, a predicted location, any suitable portion of data related to a location of user equipment, previous activity data associated with user equipment, etc.

At reference numeral 604, the last known location of the mobile communication device can be utilized to send a network initiated unstructured supplementary service data (USSD) message to the mobile communication device within a mixed network. For instance, the last known location of the mobile communication device can be stored in an application server, wherein such information can be employed to transmit the network initiated USSD message to such device via a mixed network. It is to be appreciated that the mixed network can include, for example, global system for mobile communications (GSM), IP multimedia subsystem (IMS), and the like.

With reference to FIG. 7, illustrated is a methodology 700 for communicating network initiated USSD messages to user equipment via a mixed network including GSM and IMS. At reference numeral 702, a portion of location data related to a mobile communication device can be collected. At reference numeral 704, a manner to send a network initiated USSD message can be determined based at least in part upon an E.164 address and/or an IP address. It is to be appreciated that any suitable address can be utilized to determine the location of the system. For instance, an address, in general, can refer to the location of the system using an identity appropriate for the type of network, (e.g., E.164 for GSM or IMS; IP for WiFi, etc.). In one example, the last known visitor location register (VLR) or servicing call server control function (S-CSCF) E.164 address can be utilized to determine if the message is to be sent through the normal GSM methods/techniques already defined by 3GPP (e.g., $3^{rd}$ Generation Partnership Project) or to send the message to the S-CSCF utilizing session initiated protocol (SIP) extensions to encapsulate the USSD message. In such example, the SCF or application server can determine the network (e.g., GSM or IMS) and method/technique (e.g., mobile application part (MAP) message or SIP message) based on the E.164 address. The format of the E.164 address can indicate which network the USSD message is to be sent over. For instance, a certain range is for GSM only. Another range is for IMS only. Other ranges are set aside for different types of networks (e.g., WiFi, WiMAX, etc.). At reference numeral 706, the network initiated USSD message can be transmitted within the mixed network to the mobile communication device based at least in part upon such determination.

With reference to FIG. 8, illustrated is a methodology 800 that facilitates storing a portion of location data associated with user equipment to allow transmission of a network initiated USSD. At reference numeral 802, location data can be collected and stored in an application server. For example, the location data can be collected in a manner to include the latest and/or last known location data associated with user equipment (e.g., a mobile communication device, a cellular device, a portable gaming device, a smartphone, any device capable of receiving a network initiated USSD message, etc.). In particular, the data store can store a portion of data, location data, last location associated with user equipment 108, inferred location data, predicted location data, time of location, date of location data, source of location data, configurations, settings, metadata associated with location data, etc. At reference numeral 804, the location data can be utilized to lookup a network type to transmit a network initiated USSD message. In particular, the last known VLR or S-CSCF address of the user equipment and/or mobile communication device can be utilized to lookup the network type in a local SCF or application server data store and/or database (e.g., in memory or on disk).

Figure 9:
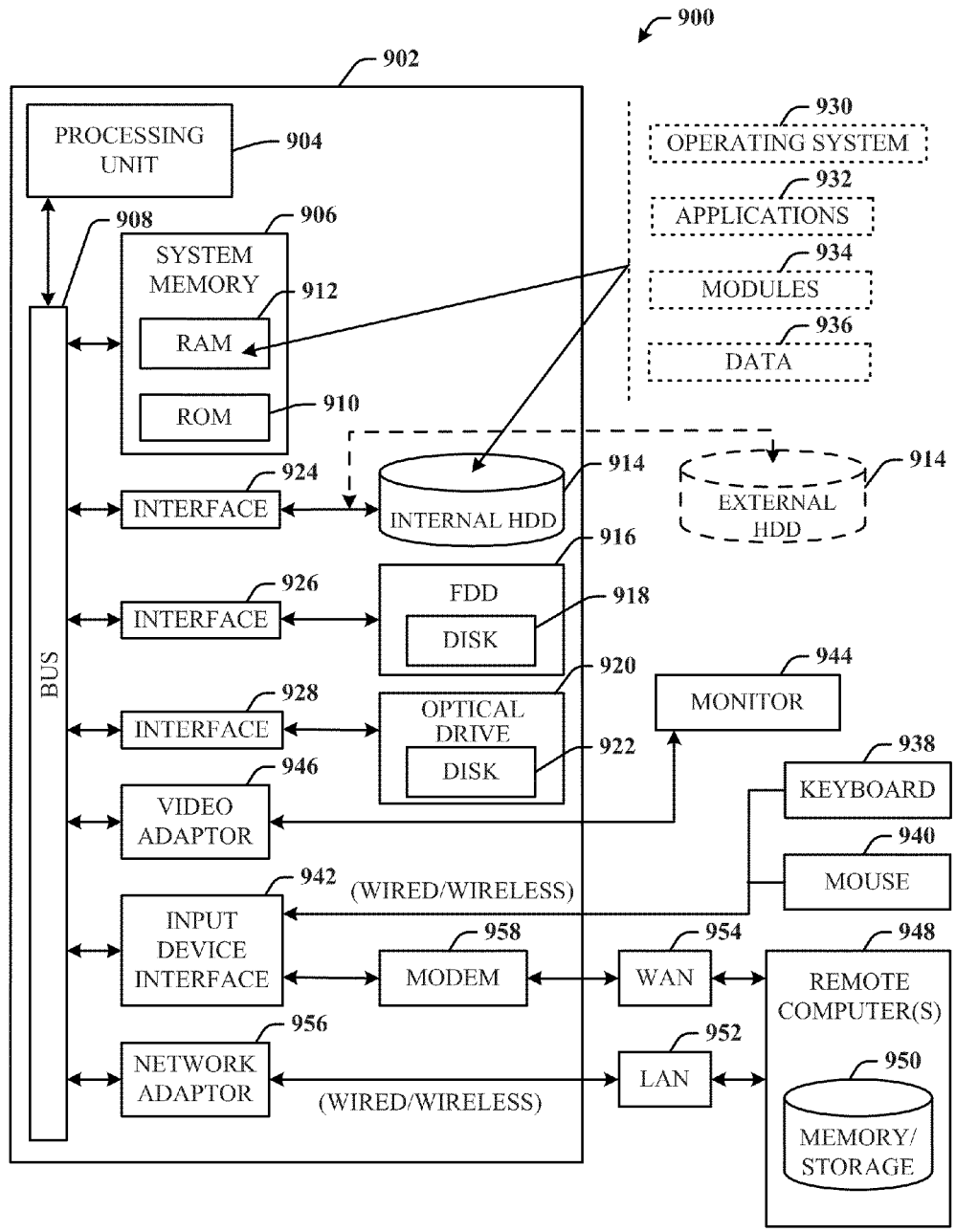
FIG. 9 illustrates a block diagram of an example computing device such as a mobile device or a remote device described herein.

Referring now to FIG. 9, there is illustrated a block diagram of an example computing device such as a mobile device or a remote device described herein. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like or clusters thereof, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
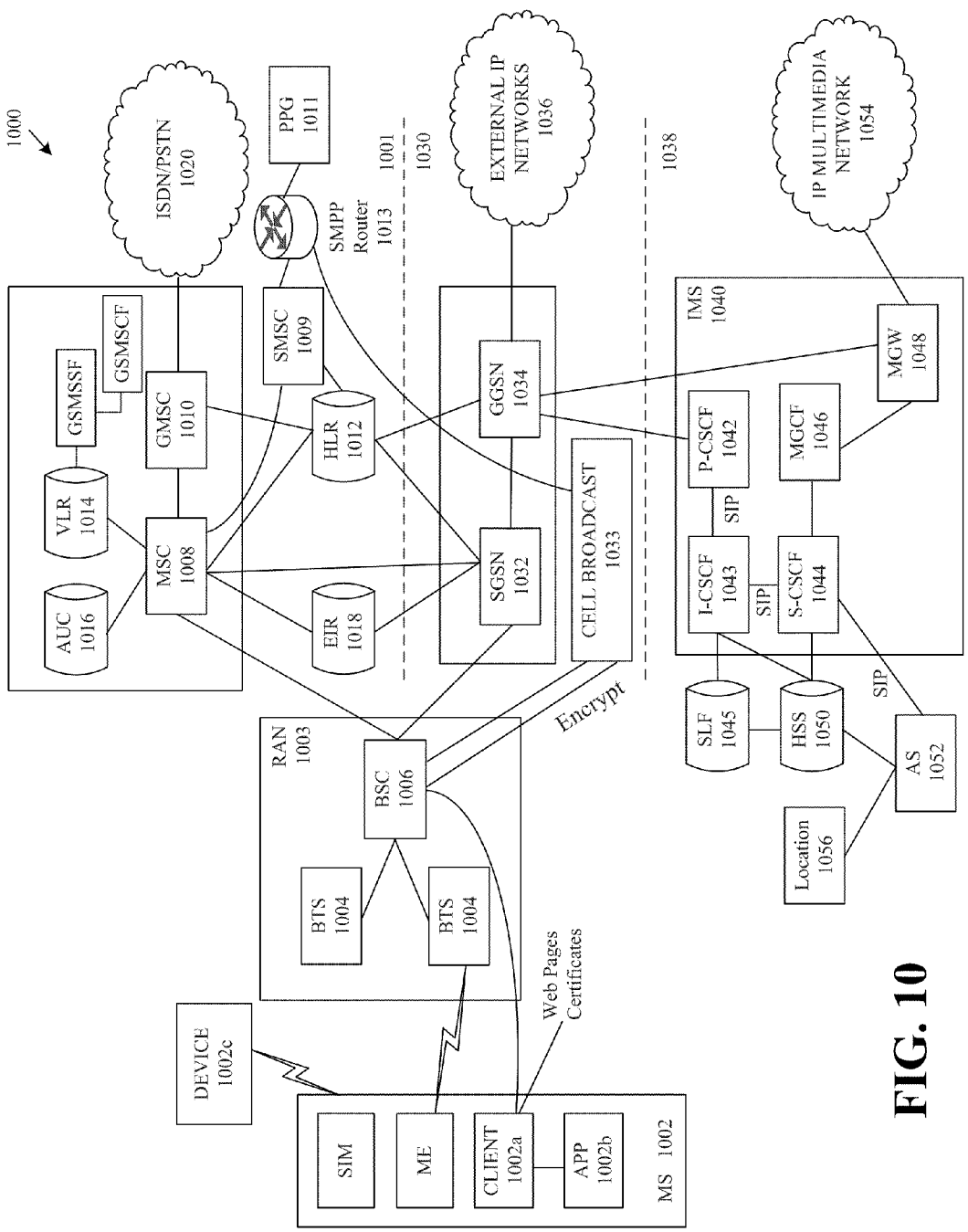
FIG. 10 illustrates an exemplary network architecture that can be employed in connection with various aspects associated with the claimed subject matter.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a may be implemented in JAVA and is discuss more fully below.

The embedded client 1002a communicates with an application 1002b that provides services and/or information to an end user. One example of the application may be navigation software that provides near real-time traffic information that is received via the embedded client 1002a to the end user. The navigation software may provide road conditions, suggest alternate routes, etc. based on the location of the MS 1002. Those of ordinary skill in the art understand that there are many different methods and systems of locating an MS 1002.

Alternatively, the MS 1002 and a device 1002c may be enabled to communicate via a short-range wireless communication link, such as BLUETOOTH. For example, a BLUETOOTH SIM Access Profile may be provided in an automobile (e.g., device 1002c) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002c. There may be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1016, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP)

protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSSs 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates communicating with user equipment configured to communicate utilizing a plurality of communication transmission techniques in a mixed network, comprising:
an intelligence component configured to receive a location history comprising, for at least one location, a history of user equipment activity and communication transmission technique employed at the at least one location, and configured to infer, based at least in part upon the location history, an inferred location of the user equipment and a communication transmission technique to be utilized to communicate with the user equipment at the inferred location, and
a location component configured to compile the location history, utilize the location history to send a network initiated unstructured supplementary service data message to the user equipment via the mixed network and transmit the network initiated unstructured supplementary service data message directly to at least one of a last known visitor location register, or a last known serving call session control function address, of the user equipment, as indicated by a previous user equipment initiated message.

2. The system of claim 1, wherein the mixed network comprises a global system for mobile communications component and an Internet Protocol multimedia subsystem component.

3. The system of claim 1, wherein the location history relates to at least one of a last known location, a current location, an inferred location, a predicted location, a portion of data related to a location of the user equipment, or previous activity data associated with the user equipment.

4. The system of claim 1, wherein the location component is integrated into an application server.

5. The system of claim 1, wherein the location component is further configured to utilize at least one of a visitor location register E.164 address, an Internet Protocol address, an address that refers to a location of the system utilizing an identity appropriate for the type of network, or a serving call session control function E.164 address to determine the communication transmission technique.

6. The system of claim 5, wherein the communication transmission technique is at least one of a transmission utilizing a global system for mobile communications defined by Third Generation Partnership Project, or a transmission utilizing a serving call session control function using session initiated protocol extensions to encapsulate the unstructured supplementary service data message.

7. The system of claim 5, wherein the communication transmission technique includes a message protocol based on the at least one address.

8. The system of claim 7, wherein the message protocol is a mobile application part message or a session initiated protocol message.

9. The system of claim 5, wherein the at least one address includes a format that indicates over which network the unstructured supplementary service data message is to be sent.

10. The system of claim 5, wherein the at least one address is associated with a transmission range that corresponds to a particular network type.

11. The system of claim 10, wherein the transmission range corresponds to at least one of a range associated with a global system for mobile communications protocol, a range associated with an Internet protocol multimedia subsystem protocol, a Wireless Fidelity transmission range, or a Worldwide Interoperability for Microwave Access transmission range.

12. A method that facilitates communicating data in a mixed network utilizing a plurality of communication transmission techniques comprising:
compiling a history of locations having activity for a mobile communication device from at least one message initiated by the mobile communication device, wherein the at least one message includes at least an address and a communication path employed by the mobile communication device communicating in the mixed network;
inferring from the history of locations a current location of the mobile communication device;
inferring from the history of locations a transmission technique to be employed to transmit a network-initiated unstructured supplementary service data message to the mobile communication device via the mixed network directly to at least one of a last known visitor location register, or a last known serving call session control function address, of the mobile communication device, as indicated by a previous mobile communication device initiated message.

13. The method of system 12, further comprising sending the unstructured supplementary service data message to the mobile communication device based on the inferred current location and transmission technique.

14. The method of claim 12, further comprising determining a mixed network communication transmission technique based on the location history and transmitting the network initiated unstructured supplementary service data message to the mobile communication device via the determined communication transmission technique, wherein the mixed network comprises a global system for mobile communications component and an Internet Protocol multimedia subsystem component.

15. A computer readable storage medium comprising computer-executable instructions that, in response to execution by a computing system, cause the computing system to perform operations comprising:
receiving a history of locations associated with a mobile communication device communicating in a mixed network at the locations;
inferring from the history of locations a current location of the mobile communication device;
inferring from the history of locations a transmission technique to be employed to transmit an unstructured supplementary service data message; and
utilizing at least the current location and the transmission technique to send the unstructured supplementary service data message to the mobile communication device via the mixed network directly to at least one of a last known visitor location register, or a last known serving call session control function address, of the mobile communication device, as indicated by a previous mobile communication device initiated message.

16. The computer readable storage medium of claim 15, wherein the history of locations includes an address of the at least one address as indicated by the previous mobile communications device initiated message, the address is associated with a communication technology that supports the unstructured supplementary service data message.

17. The computer readable storage medium of claim 15, further comprising receiving the history of locations associated with the mobile communications device communicating in the mixed network at the locations.

* * * * *